US009989163B2

(12) United States Patent
Stumpp

(10) Patent No.: US 9,989,163 B2
(45) Date of Patent: Jun. 5, 2018

(54) DIAPHRAGM VALVE DRIVE

(71) Applicant: Georg Fischer Rohrleitungssysteme AG, Schaffhausen (CH)

(72) Inventor: Juergen Stumpp, Klettgau (DE)

(73) Assignee: Georg Fischer Rohrleitungssysteme AG (CH)

( * ) Notice: Subject to any disclaimer, the term of this patent is extended or adjusted under 35 U.S.C. 154(b) by 113 days.

(21) Appl. No.: 15/066,686

(22) Filed: Mar. 10, 2016

(65) Prior Publication Data

US 2016/0265676 A1    Sep. 15, 2016

(30) Foreign Application Priority Data

Mar. 11, 2015  (EP) .................................... 15158553
Jun. 2, 2015   (EP) .................................... 15170181

(51) Int. Cl.
| | |
|---|---|
| *F16K 31/05* | (2006.01) |
| *F16K 31/50* | (2006.01) |
| *F16K 37/00* | (2006.01) |
| *F16K 7/12* | (2006.01) |
| *F16K 31/04* | (2006.01) |

(52) U.S. Cl.
CPC .............. *F16K 31/05* (2013.01); *F16K 7/126* (2013.01); *F16K 31/04* (2013.01); *F16K 31/047* (2013.01); *F16K 31/508* (2013.01); *F16K 37/0008* (2013.01); *F16K 37/0058* (2013.01); *Y10T 137/8225* (2015.04)

(58) Field of Classification Search
CPC ......... Y10T 137/8225; Y10T 137/8275; Y10T 137/8292; F16K 31/047; F16K 31/05; F16K 31/508; F16K 37/0016; F16K 37/0008; F16K 37/0058
See application file for complete search history.

(56) References Cited

U.S. PATENT DOCUMENTS

| | | | |
|---|---|---|---|
| 3,656,504 A * | 4/1972 | Topinka .............. | F16K 37/0008 116/277 |
| 4,705,061 A | 11/1987 | Mueller et al. | |
| 4,940,011 A * | 7/1990 | Wilkerson .......... | F16K 37/0008 116/277 |
| 5,277,223 A * | 1/1994 | Glockner ............ | F16K 37/0008 137/315.35 |
| 6,609,533 B2 * | 8/2003 | Sundararajan ........ | F16K 31/122 137/14 |
| 8,517,338 B2 * | 8/2013 | Hunnekuhl ............. | F16K 7/126 251/331 |

(Continued)

FOREIGN PATENT DOCUMENTS

| | | |
|---|---|---|
| DE | 3520502 C2 | 5/1994 |
| DE | 103 22 832 B4 | 7/2006 |
| WO | WO-2008-138374 A1 | 11/2008 |

*Primary Examiner* — Seth W Mackay-Smith
(74) *Attorney, Agent, or Firm* — Harness, Dickey & Pierce, P.L.C.

(57) ABSTRACT

Device for actuating a diaphragm valve, comprising a housing, wherein the housing is preferably formed of a top and bottom part, and further comprising an electric motor, a base board for the fastening of electrical components, a gear unit for actuating the diaphragm valve or the spindle nut of the diaphragm valve, and a position indicator for indicating the degree of opening of the diaphragm valve, wherein the position indicator is driven via the gear unit.

12 Claims, 3 Drawing Sheets

(56) References Cited

U.S. PATENT DOCUMENTS

| | | | | |
|---|---|---|---|---|
| 8,550,115 B2* | 10/2013 | Emanuel | .................. | E03B 7/09 |
| | | | | 137/360 |
| 2010/0033340 A1 | 2/2010 | Bogdanowicz | | |
| 2011/0215943 A1* | 9/2011 | Bernhart | ............. | F16K 37/0008 |
| | | | | 340/691.6 |
| 2013/0133763 A1* | 5/2013 | Sulmone | ............. | F16K 37/0008 |
| | | | | 137/556.6 |
| 2014/0069531 A1* | 3/2014 | Jaffrey | ................. | E21B 33/076 |
| | | | | 137/553 |
| 2014/0096850 A1 | 4/2014 | Filkovski et al. | | |
| 2014/0331913 A1* | 11/2014 | Emanuel | ............. | F16K 37/0016 |
| | | | | 116/201 |
| 2016/0153581 A1* | 6/2016 | Giubertoni | .......... | F16K 37/0016 |
| | | | | 137/553 |

* cited by examiner

DIAPHRAGM VALVE DRIVE

CROSS-REFERENCE TO RELATED APPLICATIONS

This application claims the benefit and priority of European Patent Application Nos. 15158553.6, filed on Mar. 11, 2015, and 15170181.0, filed on Jun. 2, 2015. The entire disclosures of the above applications are incorporated herein by reference.

BACKGROUND

Technical Field

The invention relates to a device for actuating a diaphragm valve, comprising a housing, wherein the housing is preferably formed of a top and bottom part, and further comprising an electric motor, a base board for the fastening of electrical components, a gear unit for actuating the diaphragm valve or the spindle nut of the diaphragm valve, and a position indicator for indicating the degree of opening of the diaphragm valve.

Discussion

Diaphragm valves are used in piping systems as shut-off members or for regulating the flow of fluids. Diaphragm valves are distinguished by the fact that they tend to be impervious to contaminated media. Inter alia, diaphragm valves are used in the chemical process industry, water treatment, in power stations, for cooling or control applications, etc. Diaphragm valves can be controlled or driven by manual, pneumatic or electrical means. In automatically controlled plants, electrically driven diaphragm valves are preferred. Such a drive has the advantage that all diaphragm valves which are equipped therewith within the system can be controlled or regulated centrally from one location.

DE 35 20 502 C2 discloses a drive device for a valve, in particular a diaphragm valve, which comprises a spindle, wherein the handle of the hand crank is configured as a screw-in sight glass, which is screwed into the housing and in which the pin for indicating the position of the diaphragm valve ascends and descends.

A drawback herein is the protruding handle, which serves as a sight glass and can be rapidly damaged by its exposed position, and also more space is required for the installation.

SUMMARY OF THE INVENTION

An object of the invention is to propose a device for actuating a diaphragm valve, in which the degree of opening of the diaphragm valve is clearly apparent and which indicates a clear position of the valve upon the conclusion of several revolutions. The device is intended to be adaptable to any manual diaphragm valve or to be interchangeable with a hand drive. By virtue of the interchangeability, it is meant to be possible to convert a manually operated diaphragm valve as easily as possible without much effort and expense into an automatically operated diaphragm valve which still permits a visual monitoring of the degree of opening of the diaphragm valve.

The object is achieved by virtue of the fact that the position indicator is driven via the gear unit.

The device for actuating the diaphragm valve comprises a housing, wherein the housing is preferably formed of a top and bottom part. Of course, the housing can also be formed from several more parts. The housing is preferably produced by injection moulding. Moreover, the device comprises an electric motor, which via the gear unit actuates the diaphragm valve or the spindle nut, whereby the diaphragm rises and falls. Furthermore, the device has a base board, on which the electrical components are arranged.

For the visual checking of the position of the diaphragm or of the degree of opening of the diaphragm valve, the device comprises a position indicator, wherein the position indicator is likewise driven via the gear unit.

In order that the degree of opening of the diaphragm valve or the position of the diaphragm is clearly detected, the device has an initiator. This represents the precise degree of opening of the diaphragm valve. Moreover, the control system, in the event of a power cut, can detect the precise position or setting of the diaphragm, or obtains through the initiator a clear signal relating to the position.

Preferably, the initiator is arranged on the position indicator. A rotary encoder has proved to be the preferred initiator, whilst other initiators which can register the precise position of the diaphragm or of the position indicator are also conceivable and usable.

The gear unit preferably has an upper and lower base plate, between which the gearwheels are arranged for the desired power transmission and rotation speed transmissions. Preferably, solely spur gears are used in the gear unit, wherein the gearwheels can be formed of different materials as well as of uniform materials.

The base plates of the gear units are spaced apart by means of spacer bolts, in order that most of the gearwheels can be arranged therebetween. Of course, alternative constructions of such a gear unit are possible. As has already previously been mentioned, the position indicator is also driven via the gear unit.

Preferably, the device is operated electrically or by means of electric current.

The position indicator indicates, by a rotational movement, the degree of opening of the diaphragm valve. The position indicator corresponds to a rotary display, in that on the display button of the position indicator, for instance, is represented a display symbol, which, upon actuation, orients itself or rotates into the appropriate position, which is formed, for instance, by a scale around the display button on the housing. This rotary movement is initiated via the gear mechanism and runs in accordance with the actuation of the spindle nut, just with a different or additional transmission ratio.

Since the initiator is preferably arranged on the position indicator, it co-rotates correspondingly and represents the clear position or degree of opening of the diaphragm valve.

The position indicator comprises, in the form of an advantageous embodiment, a position indicator shaft and a display button. The position indicator shaft runs vertically in the device, wherein the display button is arranged on the other end of the position indicator shaft.

The position indicator or the position indicator shaft runs coaxially to the spindle nut of the diaphragm valve. Preferably, the position indicator runs coaxially with that gearwheel of the gear unit which is positively connected directly to the spindle nut.

The preferred embodiment has proved to be an embodiment in which the housing has a transparent region, which is arranged above the display button and thereby enables a view of the display button, and thus of the indicator symbol which indicates the position of the diaphragm valve. By virtue of this advantageous embodiment, the complete position indicator can be arranged in the housing of the device, whereby additional sealing points can be avoided and contamination inside the device can be reduced to a minimum.

However, other possibilities for arranging a transparent region on the housing do, of course, exist.

In order that a clear indication of the degree of opening of the diaphragm valve is given, the gear mechanism has a transmission ratio such that the several revolutions of the spindle nut which are required for the complete opening and/or closing of the diaphragm valve are geared down into maximally one revolution of the position indicator for indicating the degree of opening of the diaphragm valve. By means of the initiator, which is preferably arranged on the position indicator, a control system for the device according to the invention can detect the position of the diaphragm valve and, even after a power cut, the indicator and position feedback remains clear.

Preferably, such a transmission ratio is formed by virtue of the fact that at least one further or additional gear step is arranged in the gear unit or adjoins the gear unit, which gear step serves to drive the position indicator. That is to say that, for instance, the gearwheel which is positively connected to the spindle nut is rigidly connected to a further gearwheel which is arranged coaxially thereto and hence runs at the same rotation speed, yet has a lesser diameter, and this in turn meshes with a further gearwheel in order to reduce the rotation speed, and then, via an output drive gearwheel arranged coaxially thereto, to drive the gearwheel arranged on the position indicator.

The further or additional gear steps can be arranged in the gear unit or between the upper and lower base plates, as well as outside. An advantageous embodiment has presented itself if additional gear steps are arranged on the upper base plate of the gear unit. Such an embodiment makes the device variably usable and the transmission ratio can be easily altered by exchange of the gearwheels.

By virtue of a gearing, or the connection of the spindle nut of the diaphragm valve to the gear unit, the lifting movement of the diaphragm is transformed by means of the spindle nut into a rotational movement and gears down the multiple revolutions of the spindle nut for the required lift of the diaphragm into maximally one revolution of the position indicator, whereby the degree of opening of the diaphragm valve is indicated.

It has proved advantageous for the device to have an intermediate element, which serves to fasten the device to the diaphragm valve. This intermediate element is configured such that the device can be adapted to pre-existing diaphragm valves equipped with a hand drive, or the device can be fitted in place of the hand drive.

Preferably, the device has an adapter, which couples the gear unit to the diaphragm valve or to the spindle nut.

BRIEF DESCRIPTION OF THE DRAWINGS

An illustrative embodiment of the invention is described on the basis of the figures, though the invention is not just confined to the illustrative embodiment, wherein.

DETAILED DESCRIPTION OF THE PREFERRED EMBODIMENTS

Example embodiments will now be described more fully with reference to the accompanying drawings.

Figure 1:
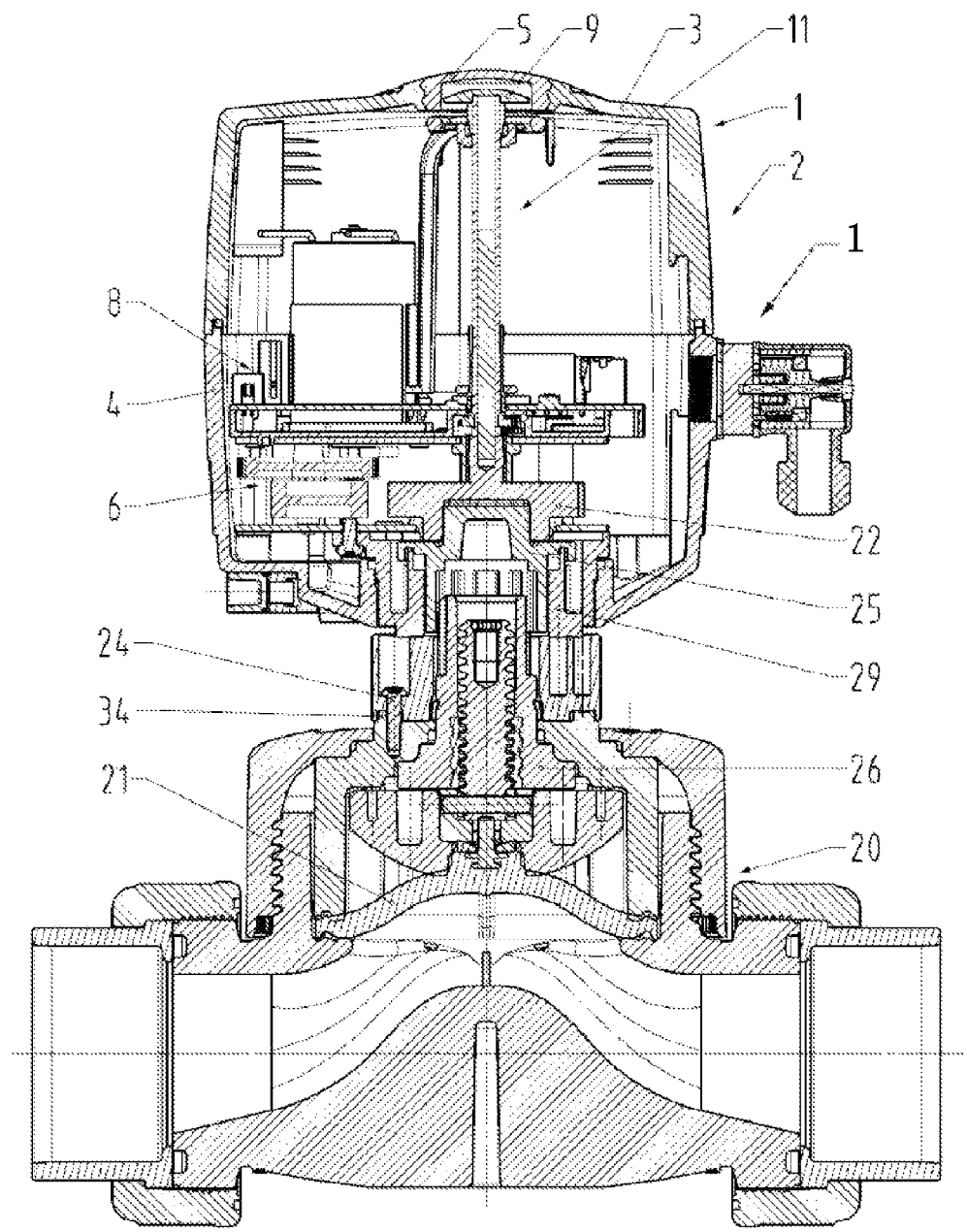
FIG. 1 shows a longitudinal section through a device according to the invention, which is already fastened on a diaphragm valve.

FIG. 1 shows the device according to the invention in longitudinal section, wherein the device 1 is already fastened to the diaphragm valve 20. The device according to the invention 1 has a housing 2, wherein the housing 2 preferably consists of a bottom part 4 and a top part 3. In the housing 2 is arranged an electric motor 7, which drives the gear unit 6, and this in turn drives the diaphragm valve 20 or its spindle nut 26, which is responsible for the lift of the diaphragm 21. For the detection of the position of the diaphragm 21 or of the degree of opening of the diaphragm valve 20, the device 1 has a position indicator 11. The position indicator 11 is likewise driven by the gear unit 6. The revolutions which are required to open and close the diaphragm valve 20 are geared down by means of the gear unit 6, and, if necessary, further gear steps, such that each degree of opening of the diaphragm valve 20 can be indicated during maximally one revolution of the position indicator 11. In order to ensure an optimal setting or position detection, the device 1 preferably has an initiator 30, wherein the initiator 30, by means of which the precise degree of opening of the diaphragm valve 20 can be registered, is preferably arranged on the position indicator 11. As an example of a preferred initiator 30, a rotary encoder, which preferably works magnetically, is portrayed in FIG. 3. Other initiators or rotary encoders which are known from the prior art are also usable. Furthermore, a base board 8, with the electrical components fastened thereon, is arranged in the device 1. The power supply is realized via a port 10.

Figure 2:
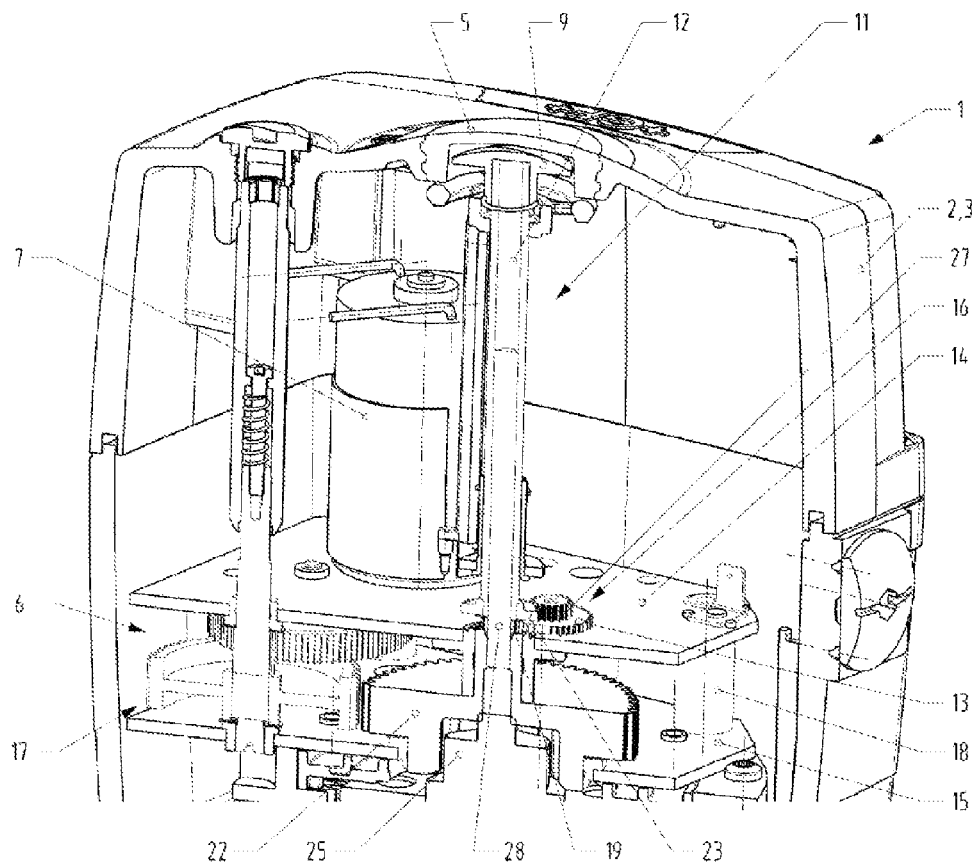
FIG. 2 shows a three-dimensional sectional view of a device according to the invention.

FIG. 2 shows, inter alia, an exemplary structure of a gear unit 6 in the device according to the invention 1. Of course, other arrangements and divisions of gear steps in a gear unit are also possible. The electric motor 7 is preferably arranged on the upper base plate 14 of the gear unit 6. On the output shaft (not visible) of the electric motor 7 is arranged a gearwheel (not visible), which meshes with a gearwheel 17 of the gear unit 6. The gear unit 6 has a number of gearwheels 17 and gear steps such that the required torque for actuating the diaphragm valve 20 or the spindle nut 26 can be achieved. The structure of such a gear unit 6, with the gearwheels 17 arranged therein, can therefore be designed individually, dependent on the driving electric motor 6 and the available space. By virtue of the three-dimensional sectional representation in FIG. 2, the position indicator 11 which is arranged in the device 1 and is driven via the gear unit 6 is clearly visible.

Figure 3:
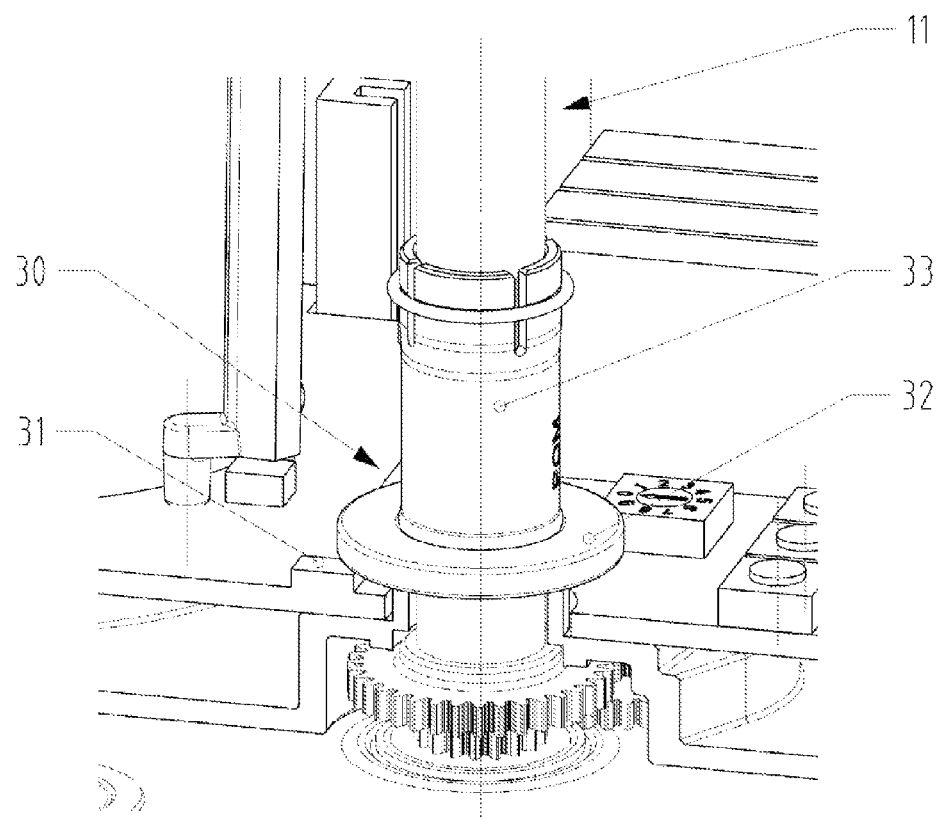
FIG. 3 shows a three-dimensional detail of the device according to the invention in the region of the initiator.

The gear unit 6 has different gearwheels 17, which are arranged in several gear steps, wherein the gearwheel 22 is positively connected to the spindle nut 26 by means of an adapter 25. The driven gearwheel 22 is thus located in the same axis as the spindle nut 26 and preferably also the position indicator 11. In order to demonstrate the degree of opening of the diaphragm valve 20 with the position indicator 11, with the gearwheel 22 a further gearwheel 19 is coaxially arranged and these are fixedly connected to each other, wherein the gearwheel 19 thus has the same rotation speed and preferably a substantially smaller diameter, since the aim consists in demonstrating the several revolutions which are required for the opening and closing of the valve 20, during maximally a single revolution of the position indicator 11. The gearwheel 19, which has the rotation speed of the spindle nut 26, is thus arranged coaxially with the gearwheel 22 connected to the spindle nut 26 and with the spindle nut 26 itself. Preferably, the gearwheel 19 is arranged above the upper base plate 14 and drives a further gear step 16, wherein the further gear step 16 serves to reduce the rotation speed and thus serves the position indicator 11. The further gear step 16 thus has a gearwheel 13 which is driven by the gearwheel 19 and has a greater diameter than the gearwheel 19, whereby the rotation speed is reduced already at this point. The gearwheel 27 which is arranged on the same gear step 16 and which is coaxially and fixedly connected to the gearwheel 13 hence assumes the rotation speed thereof and drives the gearwheel 23, which is fixedly connected to the position indicator shaft 12. Since the gearwheel 23 preferably has a greater diameter than the driving gearwheel 27, the rotation speed is here once again reduced. The position indicator shaft 12 of the position indicator 11 is mounted rotatably, with the gearwheel 23 fixedly arranged thereon, on the axle 28. On the upper end of the position indicator 11 is arranged the display button 9, which co-rotates in accordance with the position indicator shaft 12. On the position indicator 11 is preferably located an initiator 30, visible in FIG. 3. This registers the precise position or the degree of opening of the diaphragm valve 20 and transmits the registered position to a control system, which communicates with the motor 7. The magnetic rotary encoder portrayed in FIG. 3 is a possible initiator 30 which can be used for this purpose. On the position indicator 11 or on the position indicator shaft 12 is preferably arranged a magnet holder 33, on which a magnetic ring 32 of the initiator 30 or, in this embodiment, of a magnetic rotary encoder, is disposed. Serving to determine the position is the position transducer 31, which with the aid of the magnetic ring 32 detects the position of the diaphragm. Such initiators are very well known from the prior art.

As the preferred structure of the gear unit 6, this has an upper and lower base plate 14, 15, which are spaced apart by means of spacer bolts 18, and the gearwheels 17, 22 for driving the spindle nut 26 are arranged and mounted therebetween, wherein, also as previously mentioned, further gear steps for gearing down to the position indicator can also be arranged between the base plates.

The transparent region 5 in the housing 2 allows the view onto the display button 9 and thus the possibility that the complete position indicator 11 is arranged in the sealed housing 2.

In order to fasten the device 1 on a diaphragm valve 20, the device has an intermediate element 24, preferably made of plastic, as can be seen in FIG. 1. The intermediate element 24 serves as a type of transition piece and enables the device 1 to be mounted, with the receiving fixture 29 arranged thereon, on the diaphragm valve 20. The intermediate element 24 is positively connected to the device 1 according to the invention and to the diaphragm valve 20 in order to transfer the torques. The fastening means 34 for fastening the intermediate element 24 to the diaphragm valve 20 are inaccessible in the mounted state and are thereby protected against external influences.

In order to enable the power transmission of the device 1 to the spindle nut 26, an adapter 25 is positively connected to the spindle nut 26 and to the gearwheel 22.

The invention claimed is:

1. A device for actuating a diaphragm valve comprising:
    an electric motor;
    a base board for fastening electrical components;
    a gear unit for actuating the diaphragm valve or a spindle nut of the diaphragm valve;
    a position indicator for indicating the degree of opening of the diaphragm valve, the position indicator has a position indicator shaft and is driven via the gear unit, the position indicator or the position indicator shaft is coaxially connected to a gearwheel, the gearwheel is positively and coaxially connected to the spindle nut of the diaphragm valve by an adapter; and
    a housing including the electric motor, the base board, the gear unit, and the position indicator, the housing having a top part and a bottom part.

2. The device according to claim 1, wherein the device is operated by means of electric current or electrically.

3. The device according to claim 1, wherein the position indicator indicates, by a rotational movement or rotary movement, the degree of opening of the diaphragm valve.

4. The device according to claim 1, wherein the device has an initiator.

5. The device according to claim 4, wherein the initiator is arranged on the position indicator.

6. The device according to claim 4, wherein the initiator is configured as a rotary encoder.

7. The device according to claim 1, wherein several revolutions of the spindle nut, which are required for the complete opening and closing of the diaphragm valve, are geared down into maximally one revolution of the position indicator for indicating the degree of opening of the diaphragm valve.

8. The device according to claim 1, wherein the gear unit has, or adjoining the gear unit there is, at least one further or additional gear step for driving of the position indicator and corresponding gearing down of the rotation speed.

9. The device according to claim 1, wherein on the position indicator shaft is arranged a gearwheel.

10. The device according to claim 1, wherein the position indicator is arranged fully in the housing.

11. The device according to claim 1, wherein the housing has a transparent region.

12. The device according to claim 1, wherein the device has an intermediate element, wherein the intermediate element serves to fasten the device to the diaphragm valve.

* * * * *